US006598598B1

(12) United States Patent
Bratsikas

(10) Patent No.: US 6,598,598 B1
(45) Date of Patent: Jul. 29, 2003

(54) CHARCOAL GRILL WITH COOL BASE

(76) Inventor: Nicolas Bratsikas, 3024 Franciscan Dr., Apt. 1231, Arlington, TX (US) 76015

( * ) Notice: Subject to any disclaimer, the term of this patent is extended or adjusted under 35 U.S.C. 154(b) by 12 days.

(21) Appl. No.: 10/145,910

(22) Filed: May 15, 2002

(51) Int. Cl.[7] .................................................. F24C 3/08
(52) U.S. Cl. ........................ 126/25 R; 126/40; 126/279
(58) Field of Search ............................... 126/25 R, 40, 126/55, 277, 279, 30

(56) References Cited

U.S. PATENT DOCUMENTS

| 4,454,805 | A |   | 6/1984 | Matthews |
|---|---|---|---|---|
| 5,261,386 | A | * | 11/1993 | Burkhart ................... 126/25 R |
| 5,313,928 | A |   | 5/1994 | Rodgers et al. |
| 5,558,008 | A |   | 9/1996 | Jenkins |
| 5,797,386 | A | * | 8/1998 | Orr .......................... 126/25 R |
| 5,868,128 | A | * | 2/1999 | Omar ......................... 126/512 |
| D414,980 | S |   | 10/1999 | Pai |
| D415,649 | S |   | 10/1999 | Pai |
| 5,970,858 | A |   | 10/1999 | Boehm et al. |
| D420,546 | S |   | 2/2000 | Pai |
| D426,419 | S |   | 6/2000 | Kuo |
| 6,354,288 | B1 | * | 3/2002 | McDonald .................. 126/519 |

* cited by examiner

Primary Examiner—Alfred Basichas
(74) Attorney, Agent, or Firm—Lars D. Jensen

(57) ABSTRACT

An improved charcoal grill having a cool base assembly for preventing burns and damage to a table top, comprising a casing with a refractory mass, below which is an upper free air space established by insulators, and a lower free air space created by a base plate having feet or openings. One version comprises a convex shaped grill part. Another version comprises an air diffuser to speed charcoal briquet ignition.

26 Claims, 9 Drawing Sheets

CHARCOAL GRILL WITH COOL BASE

BACKGROUND

The present invention relates to charcoal grills, and more specifically to a new design having a cool base.

Most charcoal grills of prior art are dangerous, having a base which can reach temperatures of hundreds of degrees, causing severe skin burns to any adult or child who may accidentally touch the base. If a charcoal grill of prior art were to be placed upon a wooden table, it would likely burn and damage the table. Therefore, there is a need for a charcoal grill whose base can be touched without causing a skin burn, and which can be placed on a table without damaging the table.

SUMMARY

Accordingly, one objective of the present invention is to provide a charcoal grill which can be placed on any table top without causing burns or damage. This objective is achieved by placing a refractory mass below a bed of burning charcoal briquets, in combination with an upper free airspace which is below the refractory mass and above a base plate, in combination with a lower free airspace which is below the base plate and above the table top.

Another objective of the present invention is to provide a charcoal grill which can be placed on any table top without causing burns or damage, and which can speed the ignition of the charcoal briquets. This objective is accomplished by including an air diffuser in a casing below the charcoal briquets. Pressurized air is provided to an air inlet, which passes through an opening in the side of the casing leading to the air diffuser. The air diffuser has multiple air jets which are directed upward toward the charcoal briquets.

Yet another objective of the present invention is to provide a charcoal grill which can be placed on any table top without causing burns or damage, and which cooks food in a pleasing way wherein the food is more easily viewed. This objective is accomplished by making the grill part in a convex shape.

These and other features, aspects, and advantages of the present invention will become better understood with regard to the following description, appended claims, and accompanying drawings.

BRIEF DESCRIPTION OF THE DRAWINGS

The following drawings describe the present invention.

REFERENCE NUMERALS USED IN THE DRAWINGS

Figure 1:
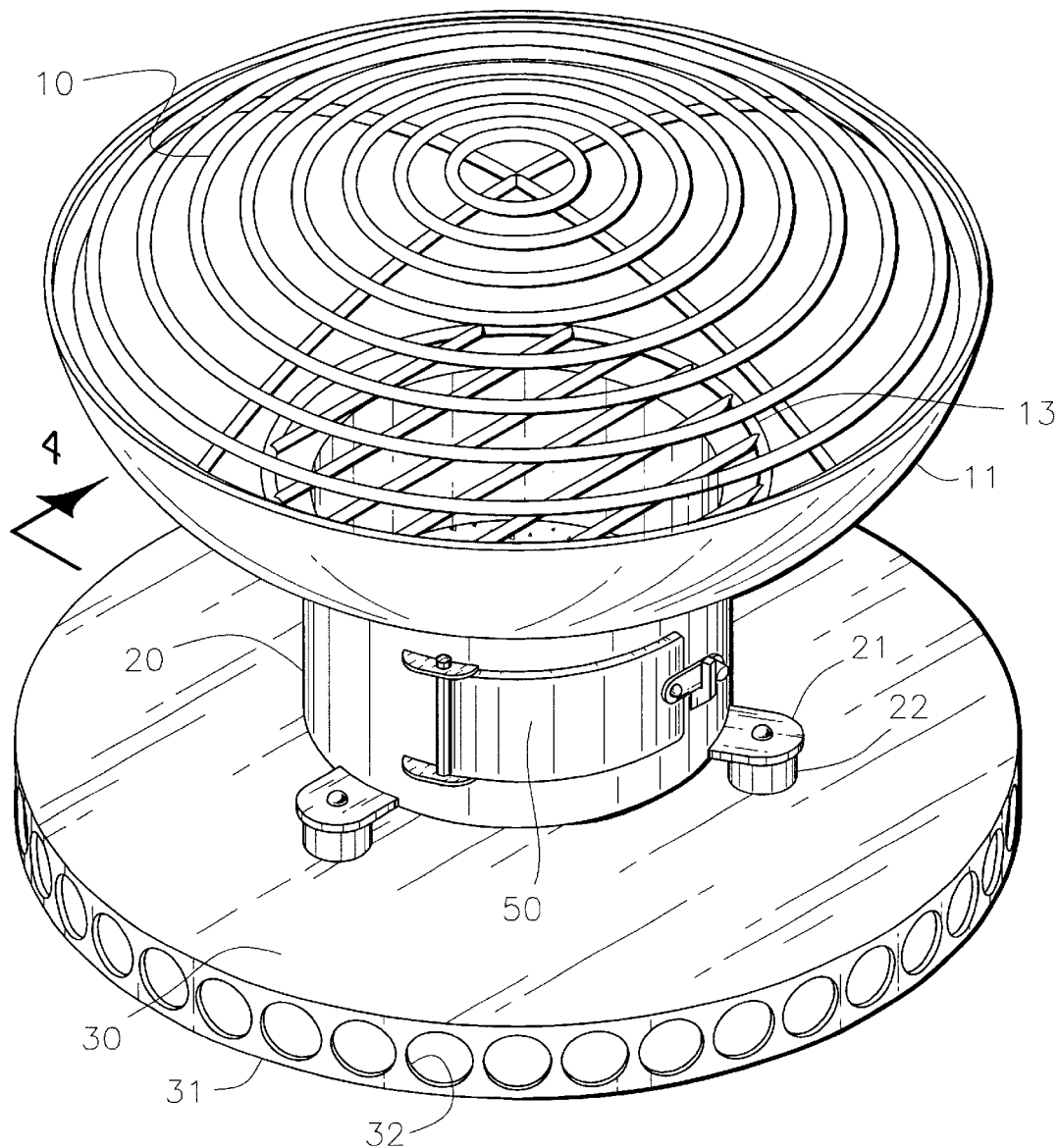
FIG. 1 is a perspective view of one embodiment of the present invention.

The following is a listing of the referenced parts:
T table top
10 grill part
11 bowl
12 edge
13 grate
15 wire ring
20 casing
21 tab
22 insulator
23 bolt
24 nut
25 embedded stud
26 casing floor
27 embedded stud
28 short bolt
30 base plate
31 wall
32 opening
33 flange
34 post
35 base ring
36 foot
37 convex base plate
38 opening
39 perimeter portion
40 refractory mass 41 top surface
42 bottom surface
44 refractory bottom
46 refractory mass
47 foot shape
48 leg shape
50 door
51 hinge
52 latch
53 catch
54 door opening
56 bracket
61 upper free air space
62 lower free air space
70 air diffuser
71 hollow manifold ring
72 air jet opening
73 inlet tube
78 inlet air
79 air jet
110 one piece grill part
111 curved plate
112 opening
120 alternate bowl
121 gutter shape
210 flat grill part
211 straight wire
310 grill part
311 wire member
312 heavy rim
313 gutter
314 drip lip
333 leg tip

DETAILED DESCRIPTION OF THE INVENTION

FIG. 1 shows the various components of a one embodiment of the present invention. A grill part 10 is supported by a bowl 11 which itself is supported on a casing 20. Note: since the overall present invention may be referred to generally as a "grill", then by contrast, the component part which specifically supports the food will be defined as "grill part" for clarity.

Figure 2:
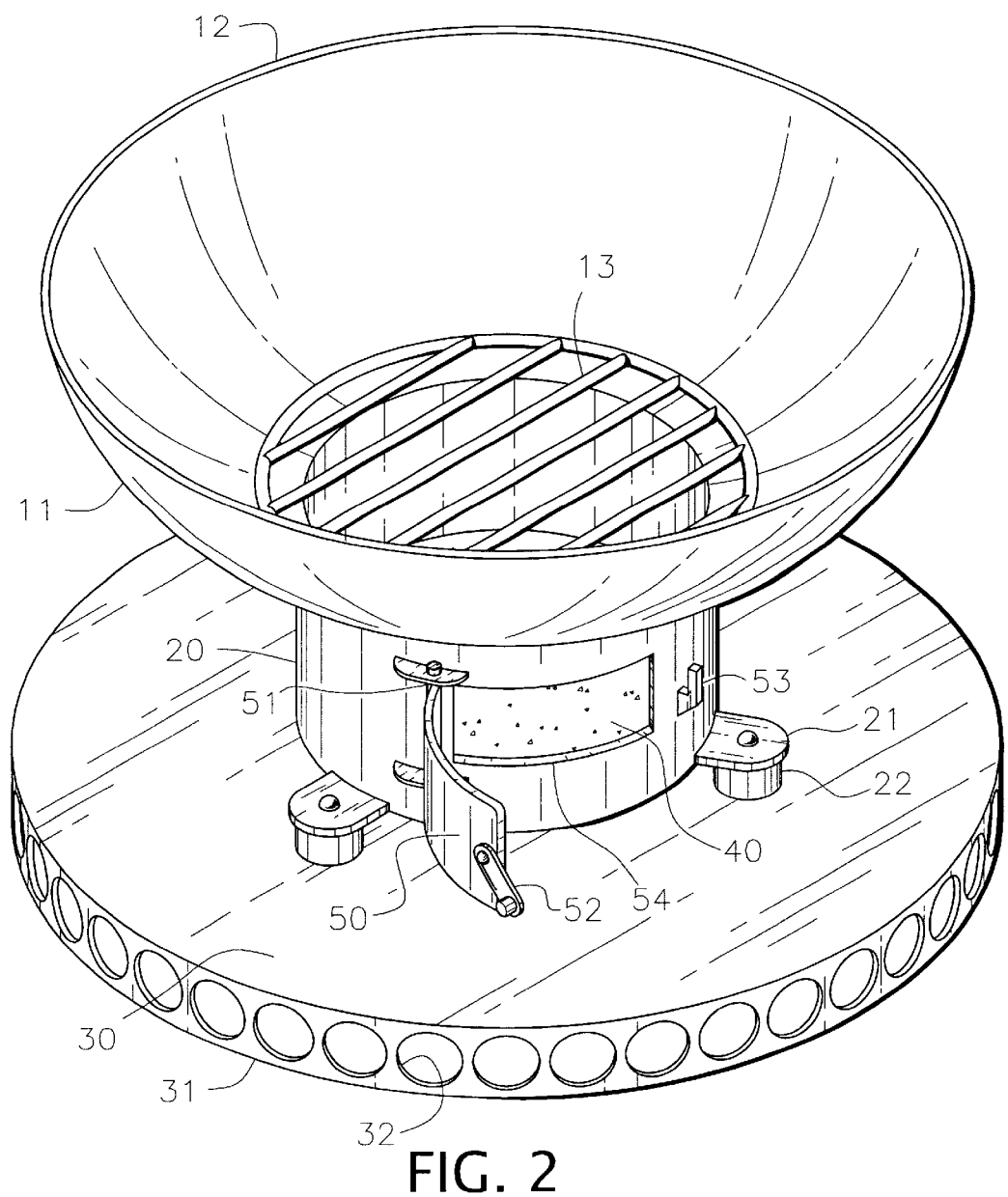
FIG. 2 is a perspective view as in FIG. 1 with the grill part removed and the door open.

The grill part 10 has been removed in FIG. 2 to better show a grate 13 which is located (or is attached) in a bottom portion of the bowl 11 and above the casing 20. While the bowl is shown having a generally spherical shape with a circular edge 12, the present invention would work equally well comprising an alternate bowl design having another shape, such as cubic, rectangular or trapezoidal box, oblate spheroidal, toroidal, pyramidal, conical, etc. In each case, an alternate grill part would be shaped with an alternate edge to suit the alternate bowl. The grill part may rest upon brackets (not shown) around the inside upper portion of the bowl.

The casing 20 is shown having a cylindrical shape in this embodiment. However, the present invention would work equally well using a casing of other shapes, such as cubic, rectangular or trapezoidal box, oblate spheroidal, toroidal, pyramidal, conical, etc.

This embodiment of the present invention shows the casing connected to the bowl, such as being fabricated of one piece of formed sheet metal, or by welding together. Another embodiment of the present invention could have the casing attached to the bowl by means of conventional fasteners, or by means of quick-release fasteners, such as draw latches or quarter-turn fasteners. If the present invention included a means for disconnecting the casing from the bowl, it would improve the portability. Another embodiment of the present invention could have the bowl guided to sit upon the casing by alignment pins fitted into corresponding openings. Yet another embodiment of the present invention could have the bowl simply sitting upon the casing.

FIG. 2 also shows a door 50 in an open position, where a latch 52 at one end has been disengaged from a catch 53 permitting the door to swing open on a hinge 51 at the other end to reveal a door opening 54.

There is a separating structure means for establishing an upper free air space 61 (shown in FIG. 4) which in this embodiment of the present invention, comprises multiple tabs 21 extending around a bottom edge of the casing 20. The tabs are resting on multiple insulators 22 which are connected to a base plate 30 by means of bolts 23 and nuts 24.

There is a resting structure means for establishing a lower free air space 62 (shown in FIG. 4) which, in this embodiment of the present invention, comprises a wall 31 having a top edge which is connected around the perimeter of the base plate 30. The wall has multiple openings 32 through which air may flow. The wall may be formed as a flange bent down from the base plate, in which case it would not be connected but would be an integral part of the base plate. There is a refractory mass 40 (shown more clearly in FIG. 4) fitted into the lower portion of the casing.

Figure 3:
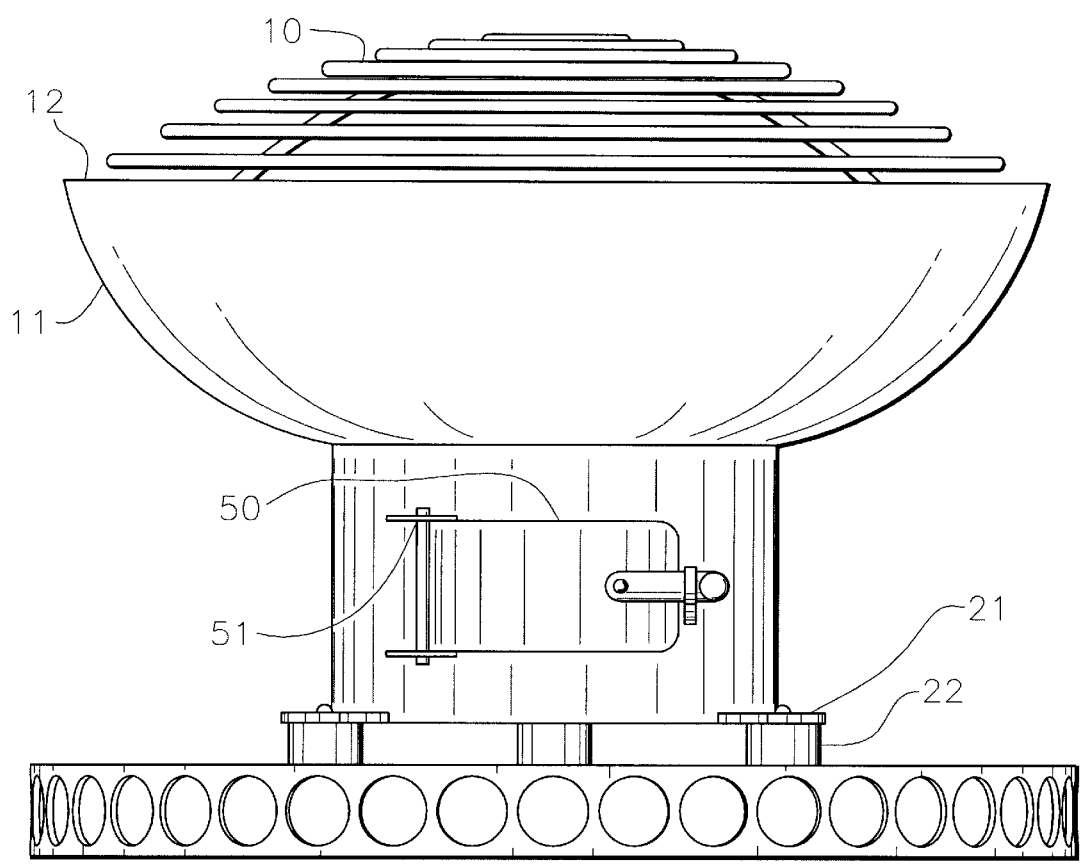
FIG. 3 is a front elevational view of one embodiment of the present invention.

FIG. 3 shows a front elevational view of the embodiment of the present invention seen in FIGS. 1 and 2.

Figure 4:
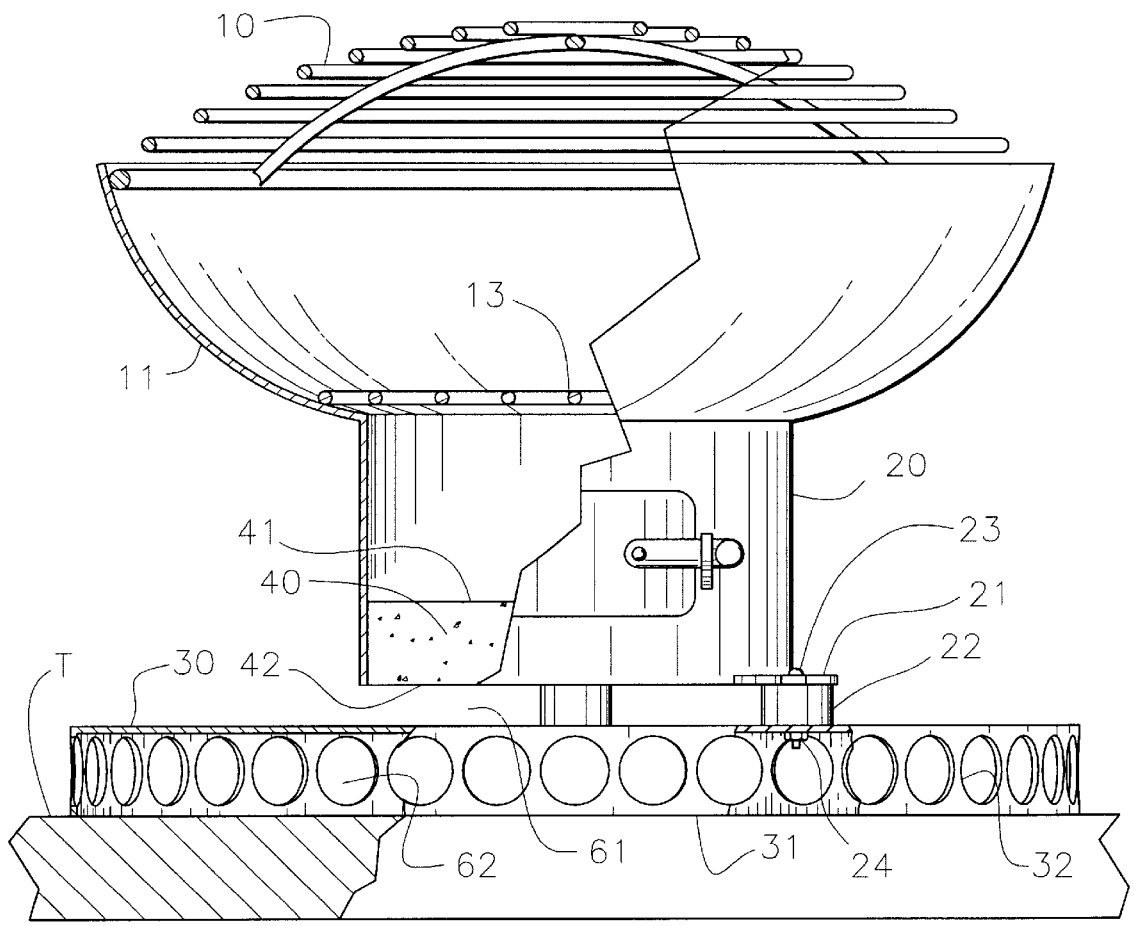
FIG. 4 is a partial cross sectional view taken on cutting plane 4 of FIG. 1.

FIG. 4 shows a breakaway cross section of the embodiment of FIG. 3. which reveals the refractory mass 40 having a top surface 41 and a bottom surface 42. The top surface is approximately level with the bottom edge of the door opening 54 (FIG. 2.) The bottom surface is approximately level with the bottom edge of the casing 20. The height of the insulators 22 establishes an upper free air space 61 between the bottom surface 42 and the base plate 30. Free air can flow into and out of the upper free air space by passing between the insulators 22. The height of the wall 31 establishes a lower free air space 62 between the base plate 30 and a table top T. Free air can flow into and out of the lower air space by passing through the openings 32.

Convective air currents will flow naturally into and out of the upper free air space 61 and the lower free air space 62, powered by local differences in air temperature.

Now having described the various components, the operation of this embodiment of the present invention can now be explained. Firstly, the grill part 10 is removed in order to load commonly-available charcoal briquets into the bottom portion of the bowl 11 and onto the grate 13. Next, the charcoal briquets are ignited using any common means. Then, the grill part is replaced so food can be placed and cooked upon it. Air supply to the briquets can be regulated by adjusting the opening angle of the door 50. When cooking is complete, the ashes of the briquets will fall through the spaces in the grate 13 into the lower portion of the casing and may be removed through the door opening 54.

One novel feature of the present invention is that, in each of its many embodiments, the bottom of the invention remains cool enough to avoid being burned when touched, having a temperature which will not damage (burn) a table top. This feature is primarily due to the novel arrangement of the refractory mass 40, the upper free air space 61 established by the separating structure means, and the lower free air space 62 established by the resting structure means.

Figure 5:
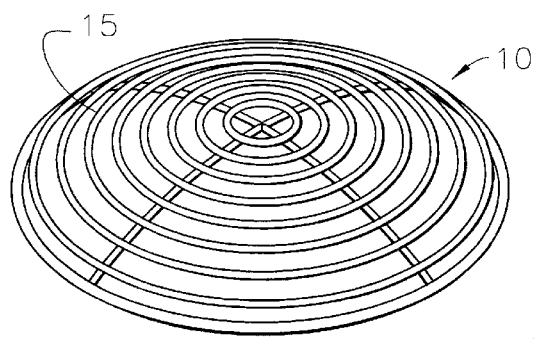
FIG. 5 is a perspective view of a grill part.

The grill part 10 is shown again in FIG. 5 comprising a series of wire rings 15 joined together and supported in a generally convex shape. However, the present invention would work equally well with the alternate versions of a grill part, such as will be seen in FIGS. 6, 7, and 8.

Figure 6:
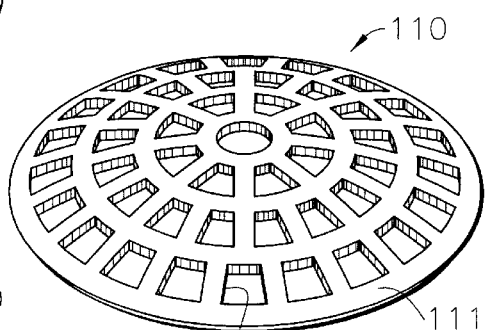
FIG. 6 is a perspective view of an alternate grill part made in one piece.

FIG. 6 shows an alternate one piece grill part 110 which comprises a curved plate 111 in which multiple openings 112 are formed. This grill part could be made using many processes and materials, such as stamped sheet metal, or cast iron.

Figure 7:
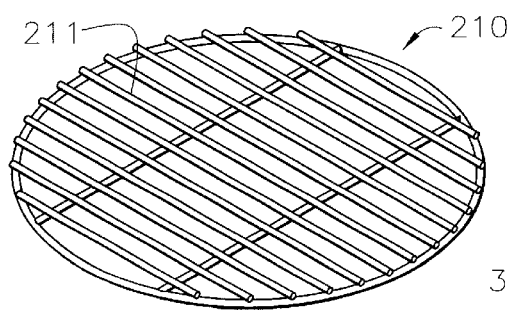
FIG. 7 is a perspective view of alternate flat grill part.

FIG. 7 shows an alternate flat grill part 210 comprised of many straight wires 211 joined together.

Figure 8:
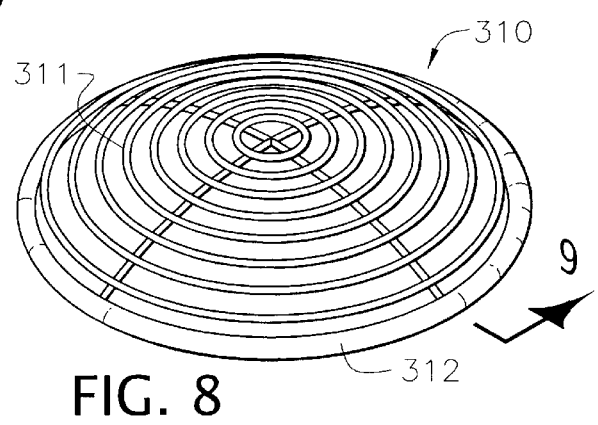
FIG. 8 is a perspective view of an alternate grill part with a heavy rim.

FIG. 8 shows an alternate grill part 310 which is similar to the grill part of FIG. 5. It is comprised of several wire members 311 which are joined and supported in a generally convex shape. A heavy rim 312 is similar to the other wire members, except that it is defined as having a larger cross section dimension than any other wire member. The heavy rim could be made of a solid bar of material or from a hollow tube.

Figure 9:
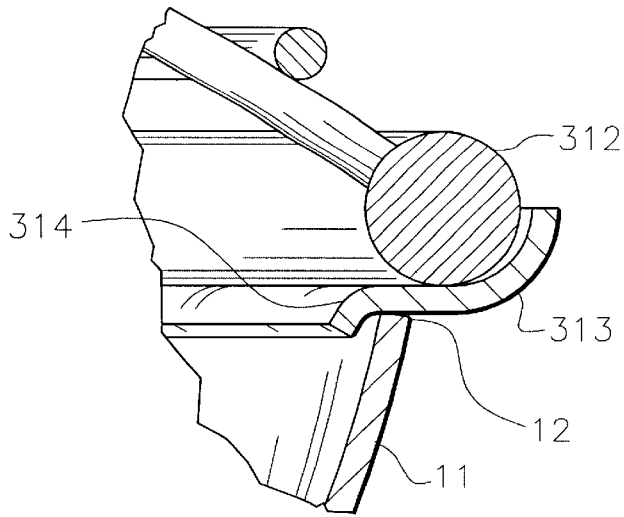
FIG. 9 is a partial cross sectional view of taken on cutting plane 9 of FIG. 8 showing the fit of a heavy rim into a gutter.

FIG. 9 shows how the heavy rim 312 could be fitted into a gutter 313 which is seated into the edge 12 of the bowl 11. The gutter is used to support the heavy rim and it also collects food juices, diverting them by means of a drip lip 314 to the inside of the bowl.

Figure 9A:
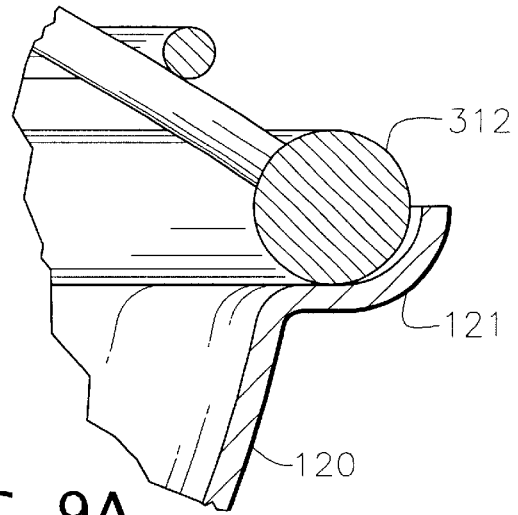
FIG. 9A is a partial cross sectional view of taken on cutting plane 9 of FIG. 8 showing the fit of a heavy rim into a gutter shape.

Another version of the present invention shown in FIG. 9A shows the heavy rim 312 fitting into a gutter shape 121 which is an integral feature of an alternate bowl 120.

Both the gutter 313 and the gutter shape 121 could be used equally well in the present invention to support any other construction of grill part.

Any of the constructions of grill parts shown in FIGS. 5, 6, 7, and 8 could be flat, convex, or concave in shape, and would work equally well in the present invention. If the edge of the bowl has a particular shape which is non-circular, then each of the constructions of grill could have a corresponding non-circular edge for fitting therewith.

Figure 10:
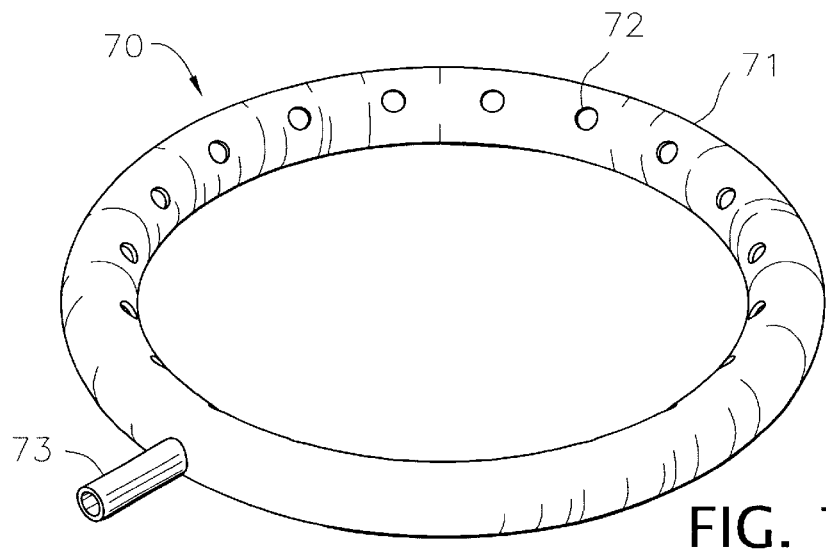
FIG. 10 is a perspective view of an air diffuser.
Figure 11:
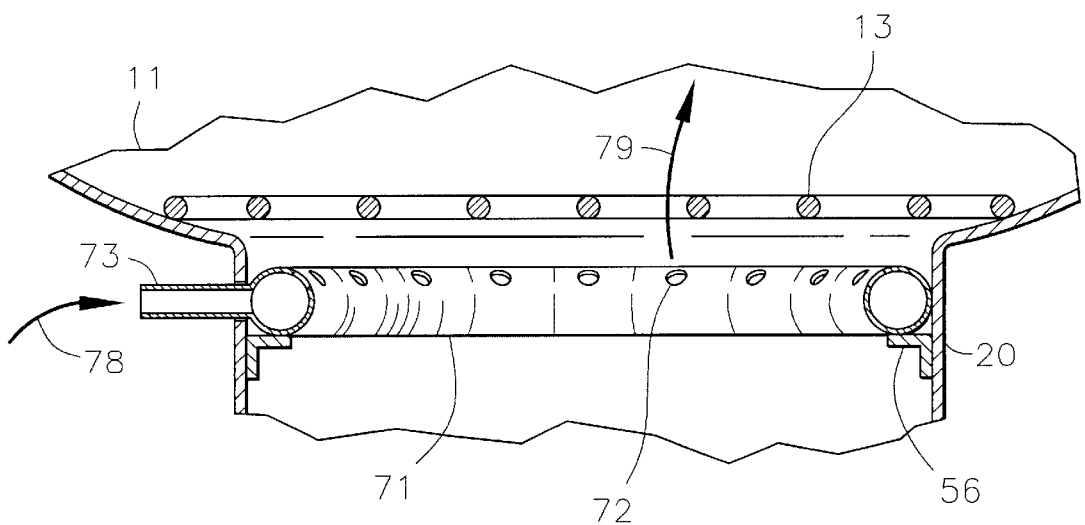
FIG. 11 is a partial cross sectional view of one embodiment of the present invention showing the internal mounting of the air diffuser.

An alternate embodiment of the present invention comprises an air diffuser means for speeding the ignition of charcoal briquets. One version of an air diffuser means shown in FIG. 10 as air diffuser 70. It is fabricated of a hollow manifold ring 71 having multiple air jet openings 72 and fitted with an inlet tube 73. FIG. 11 shows the air diffuser installed into the casing 20 and supported on brackets 56, so that the air diffuser is located at a position just below the grate 13. However, the present invention would work equally well having an air diffuser means connected in the casing by welding, or by using conventional fasteners. The speeding of the ignition of the charcoal briquets is accomplished by supplying pressurized inlet air 78 to the inlet tube (by any common means such as a hose connected to an air pump.) This air is then distributed around the inside of the hollow manifold ring, exiting as multiple air jets 79 (one from each air jet opening) directed at the charcoal briquets.

There are other constructions of air diffuser means which would work equally well in the present invention, such as feeding air to a center head having many air jets directed radially outward, or by having a hollow manifold in other shapes, such as the letter "H." The ring shape is preferred, since it allows ashes to pass by the air diffuser when dropping into the lower portion of the casing.

A critical element of the present invention is the refractory mass, such as was shown as reference numeral 40 in FIG. 4. This mass can be selected from many materials noted for their ability to withstand very high temperatures, and to block the transmission of heat energy. Candidates for the refractory mass could include: refractory cement, ceramic tile, fired brick, glass, volcanic pumice rock, and the like.

Another critical element of the present invention is the upper free air space 61 established by the separating structure means. Some embodiments of the present invention have a separating structure means comprising two or more of an insulator 22. The insulator may be constructed of a refractory material, or a plastic which can withstand high temperatures. Ideally, the material used to fabricate an insulator will have a low coefficient of thermal conductivity. While the insulators are shown connected with a bolt or stud, they can also be connected by other types of common fasteners, or they may be connected by epoxy bonding, glue, cement or the like. There are several alternate versions of the separating structure means that will work equally well in the present invention. These will be seen in FIGS. 12, 13, 14, and 15.

Figure 12:
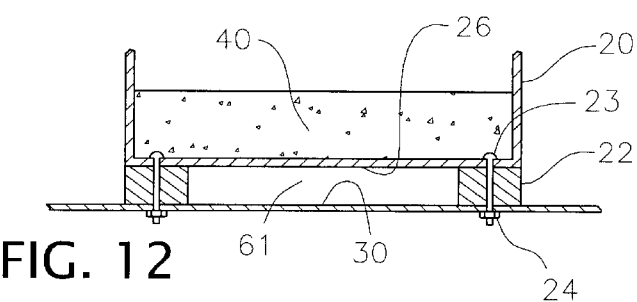
FIG. 12 is a partial cross sectional view of one version of the present invention showing a separating structure comprising insulators connected to a floor of a casing.

FIG. 12 shows the refractory mass cast in place or fitted above a casing floor 26. In this embodiment there are no tabs (such as were shown in FIG. 1) so insulators 22 are connected at an upper end to the floor.

Figure 13:
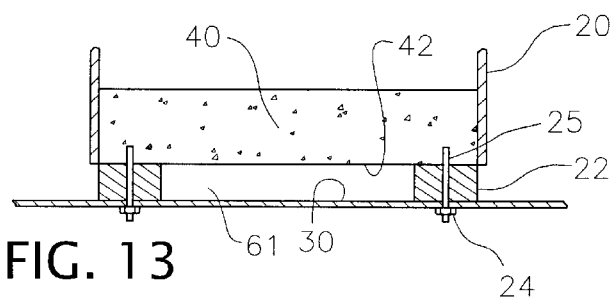
FIG. 13 is a partial cross sectional view of one version of the present invention showing a separating structure comprising insulators connected with studs embedded into a refractory mass

FIG. 13 shows the refractory mass 40 having embedded studs 25 which are used to connect through the insulators 22 and through the base plate 30 and are secured by nuts 24. The insulators are directly connected at an upper end to the refractory mass.

Figure 14:
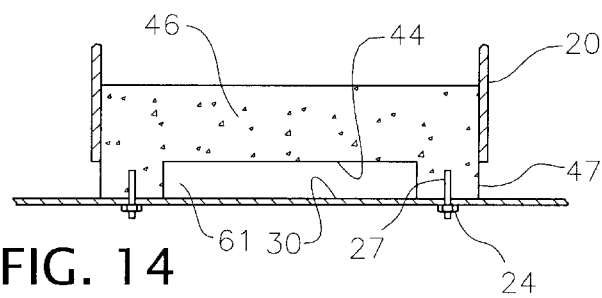
FIG. 14 is a partial cross sectional view of one version of the present invention showing a separating structure comprising foot shapes integrally cast into the refractory mass, secured by embedded studs.

FIG. 14 shows the refractory mass 46 having a shape which comprises two or more of a foot shape 47, each of which extends below the casing 20. Each foot shape functions as an insulator. There are embedded studs 27 to connect through the base plate 30 and are secured by nuts 24. In this embodiment, the upper free air space 61 is that space between refractory bottom 44 and the base plate. The heat flow through each foot shape can be minimized by fashioning a foot shape which has a narrow cross section, and which is tall in height.

Figure 15:
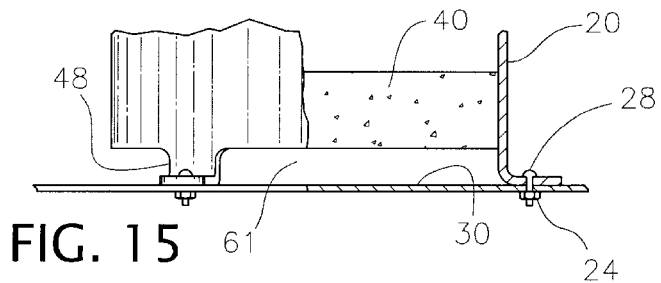
FIG. 15 is a partial cross sectional view of one version of the present invention showing a separating structure comprising leg shapes, each of which is integral to the casing and extends below the refractory mass, each of which is connected at a lower end to a base plate.

FIG. 15 shows the casing 20 having features which comprise two or more of a leg shape 48, each of which extends below the refractory mass 40. Each leg shape functions as an insulator. There are short bolts 28 to connect the leg shape to the base plate 30 using nuts 24. The heat flow through each leg shape can be minimized by fashioning a leg shape which is narrow in width, of thin material, and which is tall in height. Each leg shape is shown as an integral extension of the casing, but could also be a separate part, attached to the casing by welding or using common fasteners.

Each of the separating structure means shown in FIGS. 4, 12, 13, 14, and 15 showed the lower end of the insulator 22, foot shape 47, or leg shape 48 "connected" to the base 30. While bolts and nuts are shown, the present invention would work equally well using other types of fasteners, including quick-release types such as draw latches or quarter turn fasteners. The inventor envisions additional versions of separating structure means wherein the lower end "sits" on the base (and is not fastened.) These additional versions would work equally well in the present invention and would have the advantage of improved portability. These additional versions would benefit by providing a base plate having a receiving feature for each lower end.

Yet another critical element of the present invention is the lower free airspace 62 established by a resting structure means such as was shown in FIG. 4 comprising a base plate 30 having a wall 31 with one or more of an opening 32. However, there are several alternate constructions of resting structure means that may be used to establish the lower free air space that will work equally well in the present invention. These will be seen in FIGS. 16, 17, 18, and 19.

Figure 16:
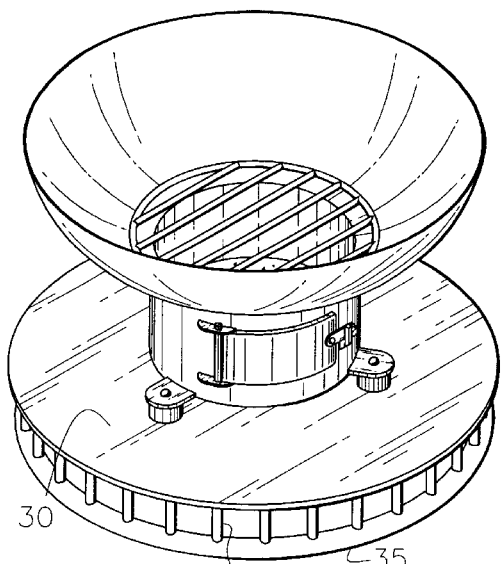
FIG. 16 is a perspective view of one embodiment of the present invention showing an alternate resting structure means comprising posts and a base ring.

FIG. 16 shows the base plate 30 supported by two or more of a post 34 having an upper end which is connected to an underside of the base plate. The lower end of each post is connected to a base ring 35. While FIG. 16 shows a version of a post which has a cylindrical shape, the present invention would work equally well with a post of any shape, such as rectangular, conical, and the like.

Figure 17:
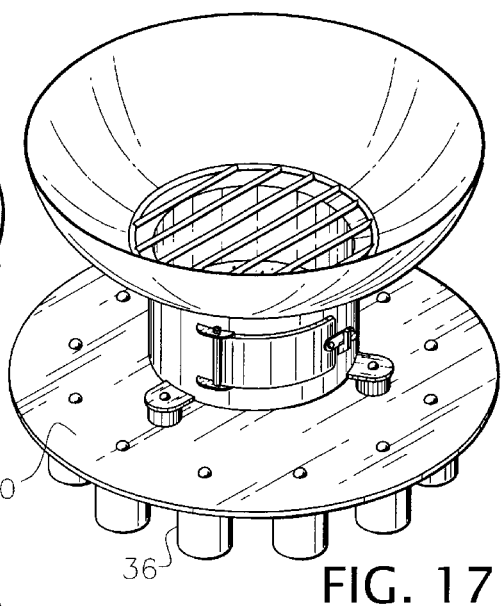
FIG. 17 is a perspective view of one embodiment of the present invention showing an alternate resting structure means comprising a base plate with multiple feet.

FIG. 17 shows the base plate 30 supported by two or more of a foot 36 each of which is connected with a fastener such as a rivet or screw (or could be cemented) to the underside of the base plate. While FIG. 17 shows a version of a foot which has a cylindrical shape, the present invention would work equally well with a foot of any shape, such as rectangular, conical, and the like.

Figure 18:
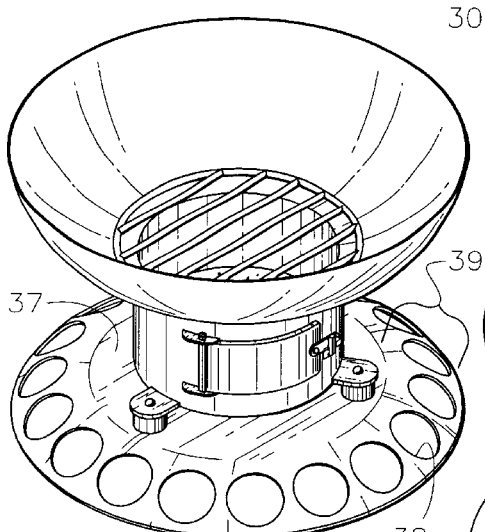
FIG. 18 is a perspective view of one embodiment of the present invention showing an alternate resting structure means comprising a convex base plate with openings.

FIG. 18 shows a convex base plate 37 whose perimeter portion 39 curves downward and which has one or more of an opening 38 through which air may flow.

Figure 19:
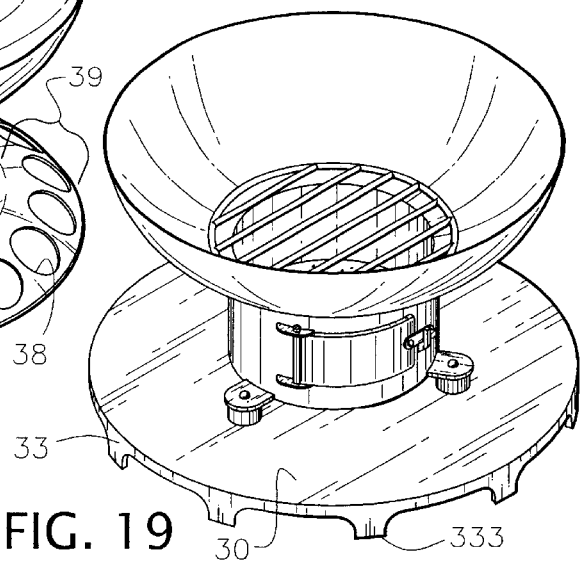
FIG. 19 is a perspective view of one embodiment of the present invention showing an alternate resting structure means comprising a flanged base plate with leg tips.

FIG. 19 shows the base plate 30 having the features of a down turned flange 33 and two or more of a leg tip 333.

There are many alternate constructions of the present invention which would work equally well. In one version, the bowl 11, the gutter shape 121, the casing 20 and the casing floor 26 could all be fabricated of one piece of sheet metal using a process called spinning or drawing. Forming by this process would be easier if the casing were to have a slight conical shape rather than the cylindrical shape previously shown.

While the above descriptions and embodiments contain many specific features by way of example, they should not be construed as limitations on the scope of the invention. Many other variations are posssible within the scope of the following claims.

I claim:

1. In a charcoal grill having a bowl; a base assembly which could be used for supporting the charcoal grill on a table top, which base assembly comprises:
   a. a casing, wherein the bowl sits on the casing,
   b. a refractory mass connected in a lower portion of the casing,
   c. a base plate disposed below the refractory mass,
   d. a separating structure means for establishing an upper free air space below the refractory mass and above the base plate, and
   e. a resting structure means for establishing a lower free air space below the base plate, which resting structure means could be used for resting upon the table top.

2. In a charcoal grill having a bowl; a base assembly which could be used for supporting the charcoal grill on a table top, which base assembly comprises:
   a. a casing connected to the bowl, wherein the casing is below the bowl,
   b. a refractory mass connected in a lower portion of the casing,
   c. a base plate disposed below the refractory mass,
   d. a separating structure means for establishing an upper free air space below the refractory mass and above the base plate, and
   e. a resting structure means for establishing a lower free air space below the base plate, which resting structure means could be used for resting upon the table top.

3. The base assembly of claim 2, which additionally comprises two or more of a tab, wherein each tab is connected to a bottom edge of the casing, and wherein the separating structure means comprises two or more of an insulator, wherein each insulator has an upper end connected to one of the tabs, and wherein each insulator has a lower end connected to the base plate.

4. The base assembly of claim 2, which additionally comprises a floor connected to a bottom edge of the casing, and wherein the separating structure means comprises two or more of an insulator, wherein each insulator has an upper end connected to the floor, and wherein each insulator has a lower end connected to the base plate.

5. The base assembly of claim 2, wherein the separating structure means comprises two or more of an insulator, wherein each insulator has an upper end connected to the refractory mass, and wherein each insulator has a lower end connected to the base plate.

6. The base assembly of claim 2, wherein the separating structure means comprises two or more of a foot shape, wherein each foot shape is integral to the refractory mass and extends below the casing, and wherein each foot shape has a lower end connected to the base plate.

7. The base assembly of claim 2, wherein the separating structure means comprises two or more of a leg shape, wherein each leg shape is integral to the casing and extends below the refractory mass, and wherein each leg shape has a lower end connected to the base plate.

8. The base assembly of claim 2, which additionally comprises two or more of a tab, wherein each tab is connected to a bottom edge of the casing, and wherein the separating structure means comprises two or more of an insulator, wherein each insulator has an upper end connected to one of the tabs, and wherein each insulator has a lower end which sits on the base plate.

9. The base assembly of claim 2, which additionally comprises a floor connected to a bottom edge of the casing, and wherein the separating structure means comprises two or more of an insulator, wherein each insulator has an upper end connected to the floor, and wherein each insulator has a lower end which sits on the base plate.

10. The base assembly of claim 2, wherein the separating structure means comprises two or more of an insulator, wherein each insulator has an upper end connected to the refractory mass, and wherein each insulator has a lower end which sits on the base plate.

11. The base assembly of claim 2, wherein the separating structure means comprises two or more of a foot shape, wherein each foot shape is integral to the refractory mass and extends below the casing, and wherein each foot shape has a lower end which sits on the base plate.

12. The base assembly of claim 2, wherein the separating structure means comprises two or more of a leg shape, wherein each leg shape is integral to the casing and extends below the refractory mass, and wherein each leg shape has a lower end which sits on the base plate.

13. The base assembly of claim 2, wherein the resting structure means comprises a wall having a top edge connected to a perimeter of the base plate, wherein the wall has one or more of an opening.

14. The base assembly of claim 2, wherein the resting structure means comprises two or more of a post, and a base ring, wherein each post has an upper end connected to an underside of the base plate, and wherein each post has a lower end connected to the base ring.

15. The base assembly of claim 2, wherein the resting structure means comprises two or more of a foot, wherein each foot has an upper end connected to an underside of the base plate.

16. The base assembly of claim 2, wherein the resting structure means comprises a perimeter portion of the base plate having a downward curved shape, wherein the perimeter portion has one or more of an opening.

17. The base assembly of claim 2, wherein the resting structure means comprises a down turned flange connected to the base plate, wherein the down turned flange has two or more of a leg tip.

18. The base assembly of claim 2, wherein the casing comprises a door opening, and a door which at times covers the door opening, wherein a first end of the door is pivotally connected to the casing with a hinge, and wherein a second end of the door has a latch for securing the door to the casing.

19. In a charcoal grill having a bowl, and charcoal briquets on a grate; a base assembly which could be used for supporting the charcoal grill on a table top, which base assembly comprises:
   a. a casing connected to the bowl, wherein the casing is below the bowl,
   b. an air diffuser means supported in the casing, which if powered by pressurized air could be used to speed charcoal briquet ignition,
   c. a refractory mass connected in a lower portion of the casing,
   d. a base plate disposed below the refractory mass
   e. a separating structure means for establishing an upper free air space below the refractory mass and above the base plate, and
   f. a resting structure means for establishing a lower free air space below the base plate, which resting structure means could be used for resting upon the table top.

20. The base assembly of claim 19, wherein the air diffuser means comprises a hollow ring having an air inlet and having one or more air jet openings.

21. A charcoal grill which can be placed on a table top, which charcoal grill comprises:
   a. a grill part,
   b. a bowl having an edge for receiving the grill part,
   c. a casing connected to the bowl, wherein the casing is below the bowl,
   d. a refractory mass connected in a lower portion of the casing,
   e. a base plate disposed below the refractory mass,
   f. a separating structure means for establishing an upper free air space below the refractory mass and above the base plate, and
   g. a resting structure means for establishing a lower free air space below the base plate, which resting structure means could be used for resting upon the table top.

22. The charcoal grill of claim 21 wherein the grill part has a convex shape.

23. The charcoal grill of claim 21 wherein the grill part comprises of a plurality of wire members having a first cross sectional dimension, wherein the grill part further comprises of a heavy rim having a second cross sectional dimension, and wherein the second cross sectional dimension is larger than the first cross sectional dimension.

24. The charcoal grill of claim 21 wherein the edge has a gutter shape.

25. The charcoal grill of claim 21 wherein the casing comprises a door opening, and a door which at times covers the door opening, wherein a first end of the door is pivotally connected to the casing with a hinge, and wherein a second end of the door has a latch for securing the door to the casing.

26. A charcoal grill which can be placed on a table top, which charcoal grill comprises:
   a. a grill part,
   b. a gutter for receiving the grill part, the gutter having a drip lip,
   c. a bowl having an edge for receiving the gutter,
   d. a casing connected to the bowl, wherein the casing is below the bowl,
   e. a refractory mass connected in a lower portion of the casing,
   f. a base plate disposed below the refractory mass,
   g. a separating structure means for establishing an upper free air space below the refractory mass and above the base plate, and
   h. a resting structure means for establishing a lower free air space below the base plate, which resting structure means could be used for resting upon the table top.

* * * * *